United States Patent
Nagata (10) Patent No.: US 10,174,826 B2
(45) Date of Patent: Jan. 8, 2019

(54) INTERNAL GEAR AND MANUFACTURING METHOD THEREOF WITH DIE

(71) Applicant: AISIN SEIKI KABUSHIKI KAISHA, Kariya-shi (JP)

(72) Inventor: Eiri Nagata, Toyoake (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 466 days.

(21) Appl. No.: 14/969,409

(22) Filed: Dec. 15, 2015

(65) Prior Publication Data

US 2016/0245388 A1 Aug. 25, 2016

(30) Foreign Application Priority Data

Feb. 20, 2015 (JP) .................................. 2015-032034

(51) Int. Cl.
*F16H 55/08* (2006.01)
*B21H 5/02* (2006.01)
(Continued)

(52) U.S. Cl.
CPC ............. *F16H 55/08* (2013.01); *B21H 5/025* (2013.01); *B23F 15/00* (2013.01); *F16H 2055/176* (2013.01)

(58) Field of Classification Search
CPC ... F16H 55/08; F16H 2055/178; B21H 5/025; B23F 15/00
See application file for complete search history.

(56) References Cited

U.S. PATENT DOCUMENTS 7,331,206 B2 * 2/2008 Aoyama ................ B21H 5/025
72/102
8,096,795 B2 * 1/2012 Ono ........................ F04C 2/102
418/150
(Continued)

FOREIGN PATENT DOCUMENTS

EP 2 116 413 A1 11/2009
FR 1.203.942 A 1/1960
(Continued)

OTHER PUBLICATIONS

Eiri Nagata, et al., "Form Rolling of Helical Gear with Small Number of Teeth and Large Helix Angle (Reduction of Helix Deviation)", The Japan Society of Mechanical Engineers, 2011, 12 pgs. (with partial English translation).
(Continued)

*Primary Examiner* — David J Hlavka
(74) *Attorney, Agent, or Firm* — Oblon, McClelland, Maier & Neustadt, L.L.P.

(57) ABSTRACT

An internal gear includes plural teeth each including an addendum area, a dedendum area, and an intermediate area including a protrusion and a recessed portion. The intermediate area includes a first border position provided at a position between the protrusion and the recessed portion, a second border position provided at a position between the intermediate area and the dedendum area, a third border position provided at a position between the intermediate area and the addendum area, a first average radius provided from the first border position to the second border position, and a second average radius provided from the first border position to the third border position. The first average radius is smaller than the second average radius. The addendum area includes a first curvature radius provided at a first center (Continued)

position in a tooth thickness direction, the first curvature radius being set at a maximum.

4 Claims, 4 Drawing Sheets

(51) Int. Cl.
    *F16H 55/17*      (2006.01)
    *B23F 15/00*      (2006.01)

(56) References Cited

U.S. PATENT DOCUMENTS

| 8,360,762 | B2* | 1/2013 | Nunami | F04C 2/102 |
|---|---|---|---|---|
| | | | | 418/150 |
| 9,856,945 | B2* | 1/2018 | Tabuchi | F16H 1/32 |
| 2004/0022660 | A1* | 2/2004 | Eisenmann | F04C 2/084 |
| | | | | 418/171 |
| 2005/0059524 | A1* | 3/2005 | Hori | F16H 1/32 |
| | | | | 475/180 |
| 2006/0171834 | A1* | 8/2006 | Ogata | F04C 2/084 |
| | | | | 418/61.3 |
| 2007/0032332 | A1 | 2/2007 | Ito | |

FOREIGN PATENT DOCUMENTS

| JP | 3947204 | 7/2007 |
|---|---|---|
| JP | 2012-161813 | 8/2012 |

OTHER PUBLICATIONS

Extended European Search Report dated Jun. 24, 2016 in Patent Application No. 15200022.0.

* cited by examiner

INTERNAL GEAR AND MANUFACTURING METHOD THEREOF WITH DIE

CROSS REFERENCE TO RELATED APPLICATIONS

This application is based on and claims priority under 35 U.S.C. § 119 to Japanese Patent Application 2015-032034, filed on Feb. 20, 2015, the entire content of which is incorporated herein by reference.

TECHNICAL FIELD

This disclosure generally relates to an internal gear and a manufacturing method thereof with a die.

BACKGROUND DISCUSSION

A known internal gear serving as a gear for a machine element is used for, for example, a high-efficiency reduction device. Such an internal gear is manufactured by a form rolling process in order to reduce manufacturing man-hours as disclosed in JP3947204B (hereinafter referred to as Patent reference 1). For example, according to a manufacturing method of the internal gear disclosed in Patent reference 1, a cylindrical work is inserted into an inside of a container having a high rigidity, and a die is pressed against the work while rotating inside of the work. Because the die is rotationally driven and is pressed against the work, the work and the container are rotationally driven by the rotation of the die.

According to Patent reference 1, recessed grooves having a same number as the number of teeth of the internal gear that is to be manufactured are positioned on an inner circumferential surface of the work at a predetermined interval in order to synchronize the work with the die.

Accordingly, because the work is fixed at the inside of the container having the high rigidity, a circularity of the work is secured. Thus, because an influence of an unbalanced load caused by processing is not remained, the form rolling process in accordance with a large deformation is effectively performed.

According to Patent reference 1, the manufacturing method of the internal gear in general is described. However, a specific tooth profile of the internal gear and a specific manufacturing method for obtaining the specific tooth profile are not specifically described.

A known internal gear includes various tooth profiles in accordance with positions to be used. For example, in order to obtain the internal gear that greatly reduces the rotational speed of the gear and that has a high-load capability, for example, the internal gear used for a hypocycloid reduction gear, the internal gear is desired to include teeth each having a tooth profile that makes the internal gear be unlikely to cause a tooth jump. A die tool that satisfies a predetermined requirement is desired to be used in order to obtain the internal gear that greatly reduces the rotational speed of the gear and that has the high-load capability.

A need thus exists for an internal gear and a manufacturing method thereof with a die which is not susceptible to the drawback mentioned above.

SUMMARY

According to an aspect of this disclosure, an internal gear includes plural teeth configuring the internal gear, the plural teeth each including an addendum area when seen from an extending direction of a rotary axis of the internal gear, a dedendum area when seen from the extending direction of the rotary axis of the internal gear, and an intermediate area when seen from the extending direction of the rotary axis of the internal gear, the intermediate area being continuously formed between the addendum area and the dedendum area, the intermediate area including a protrusion and a recessed portion, the protrusion protruding toward each of teeth surfaces of the teeth being positioned next to one another, the recessed portion being recessed so as to be away from each of the teeth surfaces being positioned next to one another, the intermediate area being continuously formed with the protrusion and the recessed portion to be formed in a trochoid curve. The intermediate area includes a first border position being provided at a position between the protrusion and the recessed portion, a second border position being provided at a position between the intermediate area and the dedendum area, a third border position being provided at a position between the intermediate area and the addendum area, a first average radius serving as an average curvature radius of an area from the first border position to the second border position, and a second average radius serving as an average curvature radius of an area from the first border position to the third border position. The first average radius is smaller than the second average radius by comparison. The addendum area includes a first curvature radius being provided at a first center position in a tooth thickness direction, the first curvature radius being set at a maximum.

According to still another aspect of this disclosure, a die for the form rolling process includes the plural teeth configuring the internal gear, the plural teeth each including an addendum area when seen from an extending direction of a rotary axis of the internal gear, a dedendum area when seen from the extending direction of the rotary axis of the internal gear, and an intermediate area when seen from the extending direction of the rotary axis of the internal gear, the intermediate area being continuously formed between the addendum area and the dedendum area, the intermediate area including a protrusion and a recessed portion, the protrusion protruding toward each of teeth surfaces of the teeth being positioned next to one another, the recessed portion being recessed so as to be away from each of the teeth surfaces being positioned next to one another, the intermediate area being continuously formed with the protrusion and the recessed portion to be formed in a trochoid curve. The intermediate area includes a first border position being provided at a position between the protrusion and the recessed portion, a second border position being provided at a position between the intermediate area and the dedendum area, a third border position being provided at a position between the intermediate area and the addendum area, a first average radius serving as an average curvature radius of an area from the first border position to the second border position, and a second average radius serving as an average curvature radius of an area from the first border position to the third border position. The first average radius is greater than the second average radius by comparison. The dedendum area includes a first curvature radius being provided at a first center position in a tooth thickness direction. The addendum area includes a second curvature radius being provided at a second center position in the tooth thickness direction. The first curvature radius is set smaller than the second curvature radius.

According to still another aspect of this disclosure, a manufacturing method of an internal gear, the manufacturing method having a form rolling process being performed with a die for the form rolling process, the die including plural teeth, the plural teeth configuring the die, the plural teeth each including an addendum area when seen from an extending direction of a rotary axis of the die, a dedendum area when seen from the extending direction of the rotary axis of the die, an intermediate area when seen from the extending direction of the rotary axis of the die, the intermediate area including a protrusion and a recessed portion, the intermediate area being continuously formed between the addendum area and the dedendum area, the protrusion protruding toward each of teeth surfaces of the teeth, the teeth surfaces being positioned next to one another, the recessed portion being recessed so as to be away from each of the teeth surfaces, the teeth surfaces being positioned next to one another; the intermediate area being continuously formed with the protrusion and the recessed portion to be formed in a trochoid curve. The intermediate area includes a first border position being provided at a position between the protrusion and the recessed portion, a second border position being provided at a position between the intermediate area and the dedendum area, a third border position being provided at a position between the intermediate area and the addendum area, a first average radius serving as an average curvature radius of an area from the first border position to the second border position, and a second average radius serving as an average curvature radius of an area from the first border position to the third border position. The first average radius is greater than the second average radius by comparison. The dedendum area includes a first curvature radius being provided at a first center position in a tooth thickness direction. The addendum area includes a second curvature radius being provided at a second center position in the tooth thickness direction. The first curvature radius is set smaller than the second curvature radius.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First and second embodiments of this disclosure will hereunder be explained with reference to FIGS. 1 to 6. An internal gear and a die are used for, for example, a hypocycloid reducer, a planetary gear mechanism and a strain wave gearing. For example, FIG. 1 illustrates an internal gear 1 and an external gear 2 that are provided at a hypocycloid reducer G.

The hypocycloid reducer G includes the internal gear 1 and the external gear 2. The number of teeth of the external gear 2 is less than the number of teeth of the internal gear 1 by one, for example. The internal gear 1 and the external gear 2 are meshed with each other at a single contact point in a circumferential direction. The internal gear 1 and the external gear 2 are not meshed with each other at a single point opposite to, or face the contact point in the circumferential direction. A round-shaped rotational plate S1 having an axis X2 is positioned inside the external gear 2 so as to be relatively rotatable with the external gear 2. A rotational drive force of an input shaft is inputted to the rotational plate S1. The rotational plate S1 rotates about an axis X1 of the internal gear 1. For example, the strain wave gearing includes an internal gear and an external gear, and the external gear has teeth that are less than the teeth of the internal gear by, for example, two. In such a case, the external gear and the internal gear are meshed with each other at two points that are symmetric about a rotational axis of the internal gear.

The internal gear 1 is fixed to a main body of a reduction device. When the rotational plate S1 being decentered from the axis X1 rotates, for example, in the clockwise direction, the external gear 2 rotates about the axis X1 while changing the contact position with the internal gear 1 in the clockwise direction. When the external gear 2 rotates a round, the external gear 2 rotates in the anti-clockwise direction relative to the internal gear 1 by one tooth because of the difference of the respective numbers of the teeth of the internal gear 1 and of the external gear 2. Thus, the rotational speed of the rotational plate S1 is greatly reduced.

Figure 1:
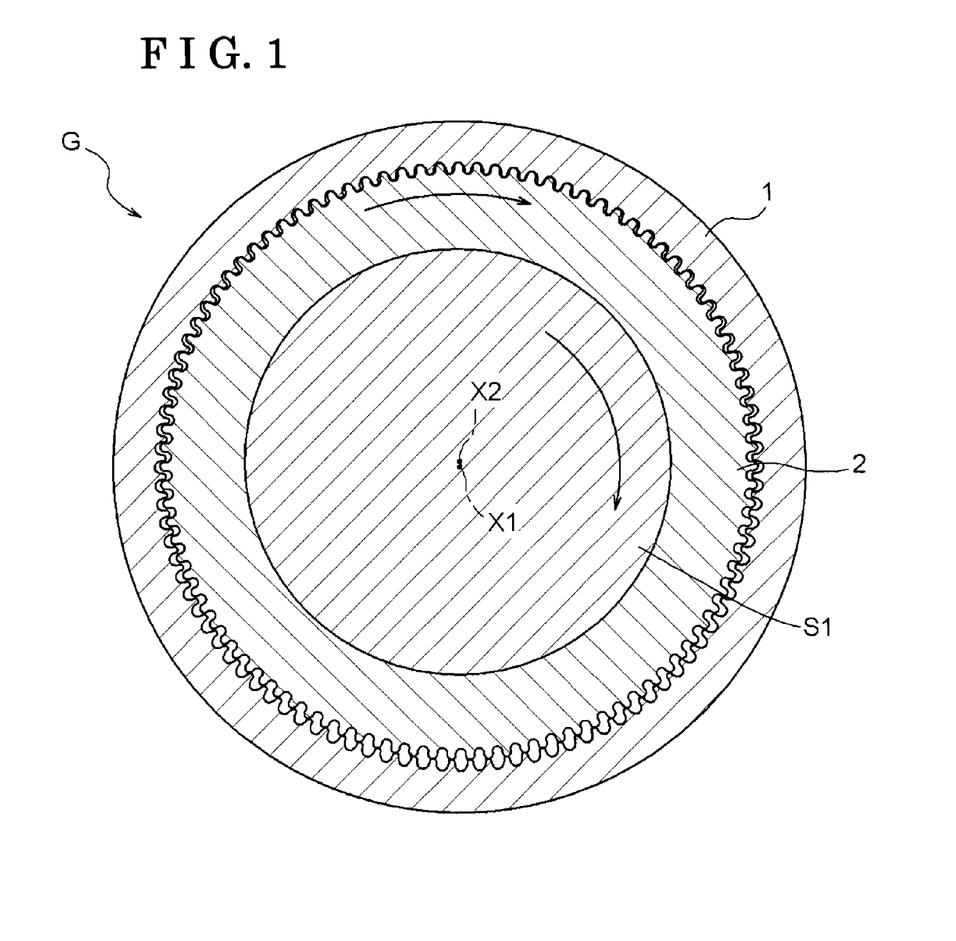
FIG. 1 is a plan view illustrating an internal gear of a reduction mechanism according to a first embodiment disclosed here.

As is clear from FIG. 1, the internal gear 1 generally includes a great number of the teeth at an outer diameter of the internal gear 1. Because the gear engagement position of the internal gear 1 and the external gear 2 corresponds to a portion along the whole circumferential direction, and because each of the teeth (module) of the internal gear 1 is small, a stress tends to be concentrated. Thus, the hardness of the teeth tends to be decreased. Accordingly, such an internal gear is desired to have high-hardness teeth and not to cause the tooth jump relative to an external gear. The internal gear having such a performance is desired to be manufactured efficiently.

Figure 2:
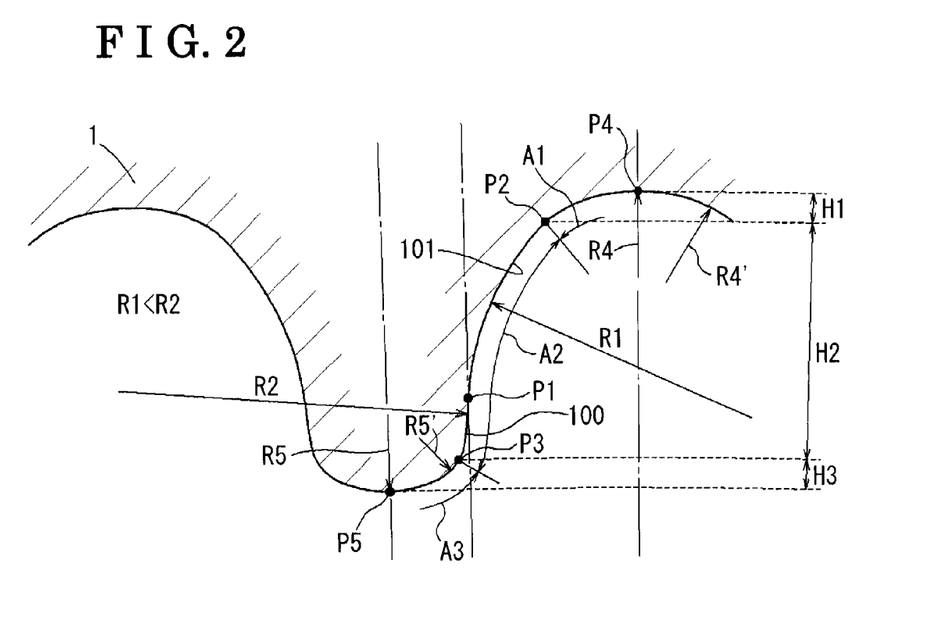
FIG. 2 is an explanatory view illustrating a tooth profile of the internal gear.

FIG. 2 shows an example of a tooth profile of the internal gear 1 when seen along an extending direction of the rotational axis. The tooth includes an addendum area A3, an intermediate area A2 and a dedendum area A1 that are positioned in the aforementioned order from a distal end along a tooth depth direction. Specifically, the intermediate area A2 is continuously provided at a position between the addendum area A3 and the dedendum area A1. The intermediate area A2 includes a protrusion 100 and a recessed portion 101. The protrusion 100 protrudes so that a surface of the protrusion 100 approaches towards a surface of an adjacent tooth. The recessed portion 101 is recessed so that a surface of the recessed portion 101 is away from the surface of the adjacent tooth. The protrusion 100 and the recessed portion 101 are formed in a trochoid curve.

A trochoid tooth profile is used as a tooth profile of a rotor of a fluid pump. That is because a great amount of the fluid can be held at a space between the gears, and because the contact ratio between the gears is high. For example, according to the hypocycloid reducer G, because respective teeth of the internal gear 1 and the external gear 2 are meshed with each other only at a single point in the circumferential direction, it is favorable that the contact ratio between the respective teeth of the internal gear 1 and of the external gear 2 is high in order to securely transmit a rotational force. The trochoid tooth profile is favorable to the internal gear 1 in terms of high contact ratio even if a distance between respective axes of the internal gear 1 and of the external gear 2 is desired to be set precisely.

The tooth having the trochoid tooth profile smoothly transmits the drive force because the specific sliding between the teeth surfaces that are in contact with each other is constant irrespective of the contact position of the teeth. Furthermore, in a state where a recessed portion and a protrusion are meshed with each other, unlike protruding surfaces of an involute gear mesh with each other, a lubricant film can be formed easily because a substantially-parallel space is generated between the recessed portion and the protrusion.

The protrusion 100 and the recessed portion 101 of the intermediate area A2 form the trochoid tooth profile, however, the respective curvature radii of the protrusion 100 and of the recessed portion 101 are different from each other. A first border position P1 is positioned between the protrusion 100 and the recessed portion 101. A second border position P2 is positioned between the intermediate area A2 and the dedendum area A1. A first average radius R1 serves as an average curvature radius of an area from the first border position P1 to the second border position P2. A third border position P3 is positioned between the intermediate area A2 and the addendum area A3. A second average radius R2 serves as an average curvature radius of an area from the first border position P1 to the third border position P3. According to the first embodiment, the first average radius R1 is set smaller than the second average radius R2.

As is clear from FIG. 2, because the second average radius R2 is increased, a pressure angle can be as small as possible up to a position close to a distal end portion of the addendum. As a result, the contact ratio between the gears can be increased, and the internal gear unlikely causes the tooth jump because a contact pressure angle between the teeth that are meshed with each other is decreased. The contact pressure angle is defined as a same definition of a contact pressure angle of a general machine element. The contact pressure angle serves as a complimentary angle of an angle being positioned between a common tangent of base circles of two gears that are meshed with each other and a straight line that connects respective centers of the two gears.

A curvature radius R5 (i.e., serving as a first curvature radius) that is positioned at a first center position P5 of the addendum area A3 in a tooth thickness direction is set at a maximum. According to the first embodiment, an addendum portion is formed to be extended in right-left directions instead of being downsized at a center of the tooth. Furthermore, in a case where a curvature radius being provided between the first center position P5 and the third border position P3 corresponds to a curvature radius R5' (i.e., serving as a second curvature radius), the curvature radius R5 is greater than the curvature radius R5'. As a result, the great volume of the addendum area A3 can be secured. Accordingly, the stress being applied to the addendum portion of the internal gear 1 when the gear is meshed with a mating gear can be decreased. Thus, the tooth is unlikely to be damaged. Accordingly, the durability of the internal gear 1 can be enhanced.

According to the first embodiment, the pressure angle that is positioned at the first border position P1 of the intermediate area A2 comes to be zero. According to the first embodiment, the extending direction of the tooth surface being positioned at the first border position P1 serves as a direction along a diameter direction of the internal gear 1. That is, the tooth surface is positioned in a longitudinal direction. When the respective teeth of the internal gear 1 and of the external gear 2 come in contact with each other, an angle that is formed between a first direction and a second direction is close to the right angle. The first direction serves as a direction applying a force to the internal gear 1 and the external gear 2 at the contact position, that is, a normal direction of the tooth surface. The second direction serves as a direction connecting the respective axes of the internal gear 1 and of the external gear 2. As a result, in a case where the great force is applied to the respective tooth surfaces, a component force that separates the internal gear 1 from the external gear 2 is unlikely to occur. Accordingly, the internal gear 1 unlikely causes the tooth jump.

A dimension H1 serves as a dimension of the dedendum area A1 that is along the tooth depth direction. A dimension H3 serves as a dimension of the addendum area A3 that is along the tooth depth direction. The dimensions H1, H3 are set 5 to 10 percent of a dimension H2 serving as a dimension of the intermediate area A2 that is along the tooth depth direction.

According to the first embodiment, the dimension H2 of the intermediate area A2 having the trochoid tooth profile is 80 to 90 percent of the whole dimension of the tooth in the tooth depth direction. Thus, an area that is effective for the gear contact, or the gear engagement can be widely maintained. Because the ratio of the dimension of the intermediate area A2 is enhanced, the respective shapes of a top land of the addendum area A3 and of a bottom land of the dedendum area A1 are inevitably flat. Comparing to the tooth profile in which the addendum and the dedendum of the tooth are downsized, the internal gear 1 includes the tooth having a rectangular-, or a substantially rectangular-tooth profile. Thus, the hardness of the addendum is enhanced. Accordingly, the internal gear 1 has a high durability.

As such, the internal gear 1 includes the tooth having the rectangular-, or the substantially rectangular-tooth profile at the addendum area A3. However, each position of the addendum area A3 is provided with a predetermined curvature radius. According to the first embodiment, as shown in FIG. 2, the curvature radius comes to be decreased towards the third border position P3 from the first center position P5, the third border position P3 that is positioned between the addendum area A3 and the intermediate area A2.

According to the first embodiment, the internal gear 1 includes the tooth having the rectangular-, or the substantially rectangular-tooth profile at the addendum area A3. Thus, the volume of a portion of the addendum area A3 that extends towards the intermediate area A2 is securely maintained. Accordingly, the hardness of the portion is enhanced. As a result, because the damage of the tooth hardly occurs and the rigidity of the tooth is enhanced in accordance with the hardness of the tooth, the internal gear 1 is unlikely to cause the tooth jump.

The curvature radius R5 is positioned at the first center position P5 of the addendum area A3 in the tooth thickness direction. A curvature radius R4 (i.e., serving as a third curvature radius) is positioned at a second center position P4 of the dedendum area A1 in the tooth thickness direction. The curvature radius R5 is set greater than the curvature radius R4 in the tooth thickness direction. As such, because a curvature radius of the dedendum area A1 is decreased at the second center position P4, the shape of a dedendum surface of the dedendum area A1, the dedendum surface that is positioned from the second center position P4 to the intermediate area A4, can be close to a round shape unlike the substantially rectangular-shape of the addendum area A3. As a result, in a case where a bending force is applied to the tooth due to the force applied to the internal gear 1 when the internal gear 1 and the external gear 2 are meshed with each other, the concentration of the stress caused around a dedendum portion can be reduced. Accordingly, the internal gear 1 is unlikely to cause the damage of the tooth. Furthermore, in a case where a curvature radius being provided between the second center position P4 and the second border position P2 corresponds to a curvature radius R4', the curvature radius R4 is greater than the curvature radius R4'.

According to the internal gear 1 of the first embodiment, the tooth profile that includes the trochoid shape and that includes the great contact ratio is available. Because the tooth surface of the contact area, or the tooth surface where the gears are meshed with each other, is provided up to a position that is close to the addendum, and because the tooth surface having the small pressure angle is provided, the internal gear 1 includes a small contact pressure angle. Thus, the internal gear 1 is unlikely to cause the tooth jump. Because the addendum is formed in the substantially rectangular-shape, the volume of the addendum area A3 is increased. Thus, the internal gear 1 can include a high hardness and a high rigidity.

Figure 3:
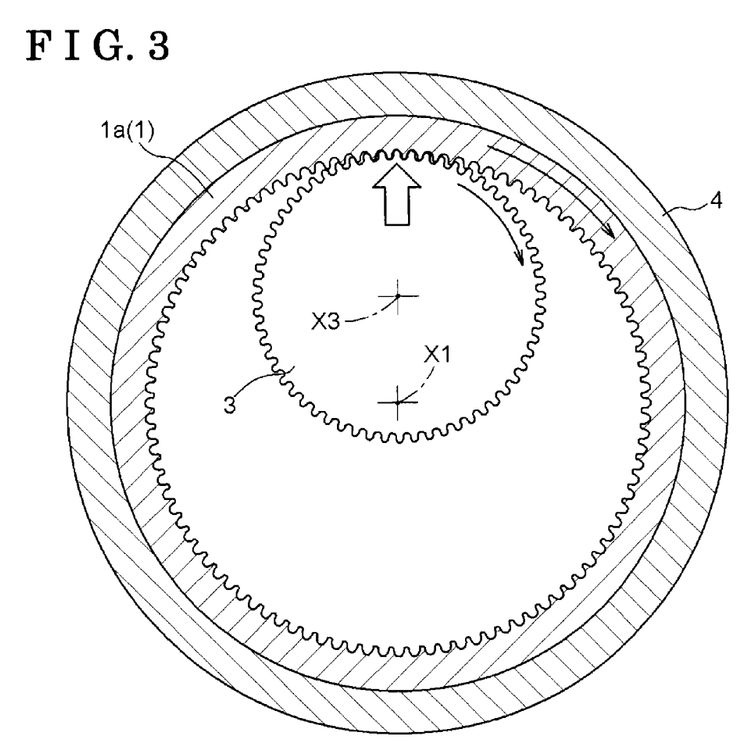
FIG. 3 is a plan view illustrating a state where the internal gear is formed by a form rolling process.

A die 3 for a form rolling process will hereunder be explained. FIG. 3 shows a state where the internal gear 1 is in the form rolling process. This method is the same as the known form rolling process for an internal gear. For the form rolling process, a work 1a of the internal gear 1 is mounted to an inside of a retainer 4. The die 3 presses against the work 1a while rotating by a drive unit. Because the work 1a being retained by the retainer 4 is meshed with the die 3, the work 1a and the retainer 4 are driven by the rotation of the die 3. Alternatively, the work 1a can rotate. In a case where the work 1a, the retained 4 and the die 3 correspond to a gear, the work 1a and the die 3 can be synchronously rotated with each other so as to perform the gear engagement rotation.

Figure 4:
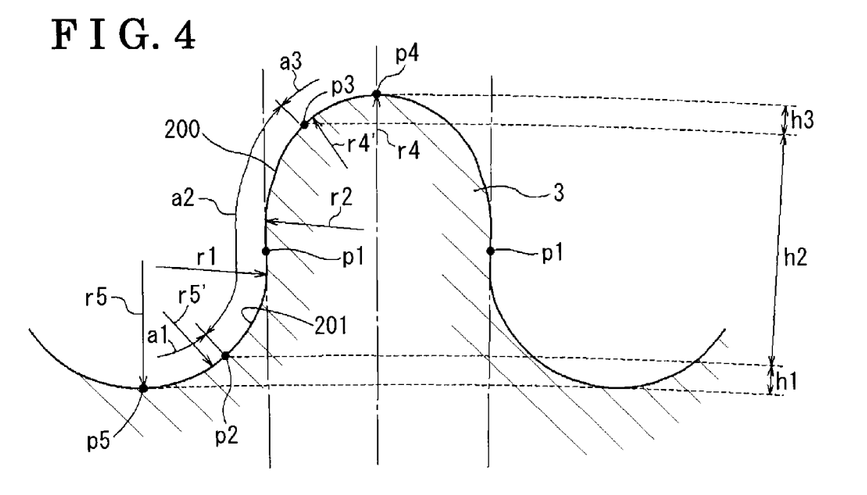
FIG. 4 is an explanatory view illustrating a tooth profile of a die.

FIG. 4 illustrates an example of a tooth profile of the die 3. The die 3 includes three areas that are similar to the internal gear 1. That is, the die includes an addendum area a3, a dedendum area a1, and an intermediate area a2. The intermediate area a2 is continuously provided at the position between the addendum area a3 and the dedendum area a1. As shown in FIG. 4, the addendum area a3 serves as an area of a portion that is positioned closer to the addendum than a border position p3. The dedendum area a1 serves as an area of a portion that is positioned closer to the dedendum than a second border position p2. The intermediate area a2 serves as an area from the second border position p2 to the border position p3. The intermediate area a2 includes a protrusion 200 and a recessed portion 201. The protrusion 200 includes a surface that extends to a side where a tooth groove is positioned. The recessed portion 201 is recessed relative to the tooth groove. The protrusion 200 and the recessed portion 201 are continuously provided via the first border position p1. Thus, the protrusion 200 serves as an area from the first border position p1 to the border position p3. The recessed portion 201 serves as an area from the border position p1 to the second border position p2.

A first average radius r1 serves as an average radius of the curvature radius of the area of the intermediate area a2 being provided between the first border position p1 and the second border position p2. A second average radius r2 serves as an average radius of the curvature radius of the area of the intermediate area a2 from the first border position p1 to the border position p3. The first average radius r1 is set greater than the second average radius r2.

According to the first embodiment, the tooth surface of the internal gear 1, the tooth surface having the trochoid shape for the gear engagement, is formed up to a side where the addendum is positioned. Thus, the internal gear 1 is unlikely to cause the tooth jump while having the high contact ratio of the gears.

It is important to stably form the dedendum when the die 3 starts the form rolling process. That is, when the dedendum is formed at the beginning of the process, the addendum of the die 3 precisely forms the tooth grooves of the internal gear 1 because the addendum of the die 3 is entered into the tooth grooves so as to be fitted to the dedendum. When the dedendum is not stably formed, the addendum of the die 3 cannot be entered into the work 1a. As a result, the tooth profile cannot be precisely formed. The die 3 is damaged because an excessive stress is applied to the addendum of the die 3. To prevent this, it is favorable that the addendum of the die 3 is formed to be downsized to some extent so as to be made inroads into the work 1a when the die 3 starts pressing against the work 1a.

A curvature radius r4 (i.e., serving as a second curvature radius) is positioned at a second center position p4 of the addendum area a3 of the die 3 in the tooth thickness direction. A curvature radius r5 (i.e., serving as a first curvature radius) is positioned at a first center position p5 of the dedendum area a1 in the tooth thickness direction. The curvature radius r4 is set smaller than the curvature radius r5 in the tooth thickness direction. Furthermore, in a case where a curvature radius being provided between the second center position p4 and the border position p3 corresponds to a curvature radius r4', the curvature radius r4 is greater than the curvature radius r4'. In a case where the curvature radius being provided between the first center position p5 and the third border position p3 corresponds to the curvature radius r5', the curvature radius r5 is greater than the curvature radius r5'.

Accordingly, the addendum area a3 of the die 3 is formed comparatively pointed, however, the dedendum area a1 is formed close to a flat surface comparing to the addendum area a3. Thus, in a case where the tooth of the die 3 presses against the work 1a, the stress applied to the addendum is prevented from increasing. Accordingly, the addendum of the die 3 favorably presses against the work 1a. As a result, because the addendum is unlikely to cause the damage, the life duration of the die 3 is extended.

The curvature radius r4 that is positioned at the second center position p4 of the addendum area a3 in the tooth thickness direction is set smaller than the curvature radius r5 that is positioned at the first center position p5 of the dedendum area a1 in the tooth thickness direction in order for the die 3 to favorably press against the work 1a and in order for the addendum of the die 3 to prevent from being damaged.

According to the embodiment, a surface shape of the second center position p4 of the addendum area a3 is sharper than a surface shape of the first center position p5 of the dedendum area a1. Because the addendum of the die 3 is formed in a sharped shape, the addendum of the die 3 is easily entered into the work 1a when the die 3 presses against the work 1a. Thus, for example, the tooth of the die 3 is favorably engaged with the work 1a in a case where the addendum of the die 3 comes in contact with the work 1a when the die 3 starts the form rolling process. Accordingly, the dedendum of the internal gear 1 can favorably be formed with a predetermined pitch by the die 3 that presses against the work 1a even if the tooth grooves are not formed at the surface of the work 1a previously.

As described above, according to the internal gear 1 of the first embodiment, the dimension H1 of the dedendum area A1 and the dimension H3 of the addendum area A3 in the tooth depth direction is set 5 to 10 percent of the dimension H2 of the intermediate area A2. The dimension of the die 3 is set with the same condition as the dimension of the internal gear 1. That is, the dimension h1 of the dedendum area a1 along the tooth depth direction and the dimension h3 of the addendum area a3 along the tooth depth direction are set 5 to 10 percent of a dimension h2 of the intermediate area a2 in the tooth depth direction.

According to the die 3 including the trochoid-shaped tooth, the die 3 is unlikely to interfere the tooth grooves being formed at the work 1a when the form rolling is processed. Accordingly, the number of the teeth of the die 3 having a predetermined diameter can be increased. For example, in a case where the number of the teeth of the internal gear 1 is, for example, 100, the die 3 having, for example, 60 teeth can be used for the form rolling process. Thus, the burden applied to the tooth when the form rolling process is performed is reduced. Accordingly, the life duration of the die 3 is extended. Because the life duration of the die 3 is extended, the internal gear 1 having a precise tooth profile can be effectively manufactured.

The tooth profile of the die 3 is formed by grinding or polishing. For example, a first grindstone and a second grindstone are provided. The first grindstone has a cross section of a first area from the first center position p5 of the dedendum to the second center position p4 of the addendum. The second grindstone has a cross section of a second area from the second center position p4 of the addendum to the first center position p5 of the dedendum. The surface of the first area and the surface of the second area are positioned opposite to each other. Each of the teeth of the work 1a is grinded by using the first and second grindstones alternately. It is favorable that the respective grinding areas of the first and second grindstones are slightly set wide in width in order to overlap with each other at the second center position p4 and at the first center position p5.

Figure 5:
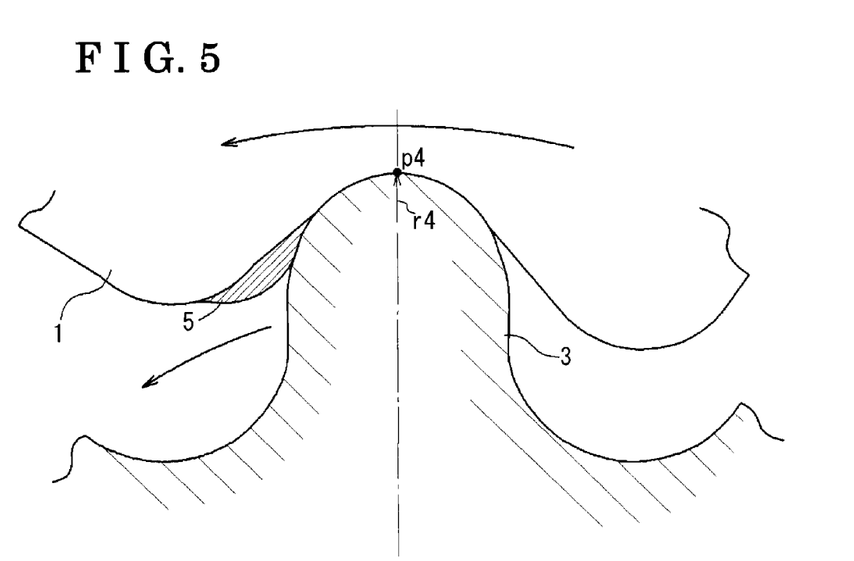
FIG. 5 is an explanatory view illustrating a flow of a base material of a work in a state where the work is formed by the form rolling process.

Because the die 3 presses against the work 1a while rotating, a fluid state of the base member varies at a front and at a rear of the tooth even if the die 3 is formed so as to easily press against the work 1a. As shown in FIG. 5, in a case where a front surface of the tooth of the die 3 has a same shape as a rear surface of the tooth of the die 3, the base material of the work 1a that is pressed aside by the addendum of the die 3 is protruded along opposing ends (in front-rear directions) of the tooth of the die 3. At this time, the stress applied to the tooth of the die 3 is increased at a front side of the die 3 in a rotational direction. That is, the stress that presses against the work 1a is increased at the front side of the die 3 in the rotational direction. Because the base material is pressed forward of the tooth of the die 3, a projecting portion 5 is generated at a position of the work 1a, the position that corresponds to the front side of the die 3 in the rotational direction. Because the stress applied to the addendum of the die 3 from the work 1a is applied from the frontward to the rearward of the tooth along the rotational direction, a bending force is applied to the rearward of the tooth in the rotational direction. The bending force causes a deformation and a damage of the tooth of the die 3.

Figure 6:
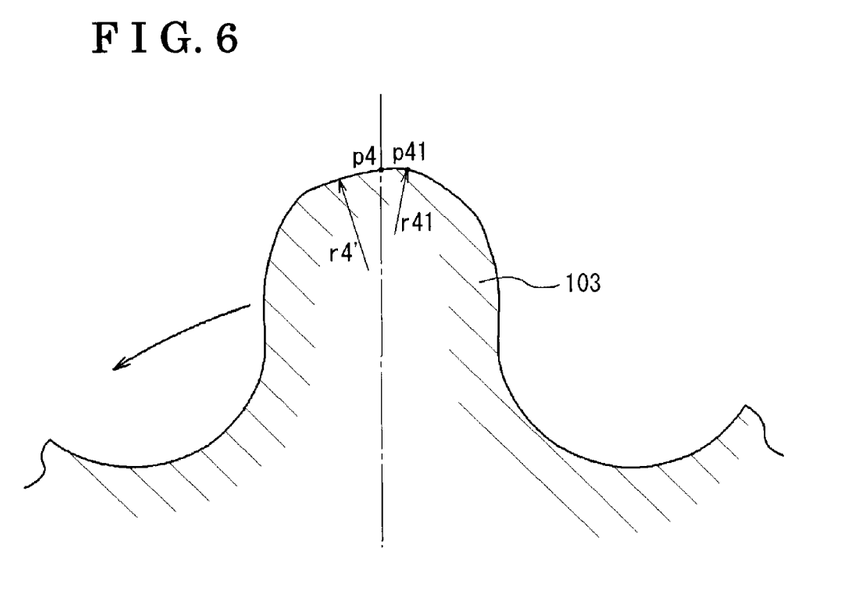
FIG. 6 is an explanatory view illustrating a tooth profile of a die according to a second embodiment.

Here, as shown in FIG. 6, according to the second embodiment, a die 103 is formed such that a highest position p41 that serves as the highest addendum of the addendum area a3 is dislocated to either one side (i.e., serving as a first side) or the other side (i.e., serving as a second side) relative to the second center position p4. In FIG. 6, the highest position p41 is dislocated to the right relative to the second center position p4. In this case, as shown with an arrow, the rotational direction of the die 103 corresponds to the anti-clockwise direction. The rotational direction of the die 103 is constant when the die 103 forms the tooth groove deeply. When the work 1a is formed with the tooth groove to some extent, the die 103 can reversely rotate to balance the tooth surface.

According to the second embodiment, because the die 103 rotates so that the highest position p41 of the each tooth follows the second center position p4, or touches the work 1a later than the second center position p4, the stress applied to the frontward of the tooth can be prevented from increasing. As a result, the base material of the work 1a does not include an excessive protrusion. Accordingly, the work 1a can be formed with an appropriate tooth profile. Because the bending force being applied to the tooth is reduced, the tooth is prevented from being damaged.

The industrial applicability of the disclosure will hereunder be explained. The internal gear 1 and the die 3 of the disclosure are applicable to, for example, a machine element having an internal gear in addition to the hypocycloid reducer, the planetary gear mechanism and the strain wave gearing that are used as a reduction mechanism of the machine element.

According to the aforementioned embodiment, the internal gear (1) includes the plural teeth configuring the internal gear (1), the plural teeth each including the addendum area (A3) when seen from an extending direction of the rotary axis of the internal gear (1), the dedendum area (A1) when seen from the extending direction of the rotary axis of the internal gear (1), and the intermediate area (A2) when seen from the extending direction of the rotary axis of the internal gear (1), the intermediate area (A2) being continuously formed between the addendum area (A3) and the dedendum area (A1), the intermediate area (A2) including the protrusion (100) and the recessed portion (101), the protrusion (100) protruding toward each of the teeth surfaces of the teeth being positioned next to one another, the recessed portion (101) being recessed so as to be away from each of the teeth surfaces being positioned next to one another, the intermediate area (A2) being continuously formed with the protrusion (100) and the recessed portion (101) to be formed in the trochoid curve. The intermediate area (A2) includes the first border position (P1) being provided at the position between the protrusion (100) and the recessed portion (101), the second border position (P2) being provided at the position between the intermediate area (A2) and the dedendum area (A1), the third border position (P3) being provided at the position between the intermediate area (A2) and the addendum area (A3), the first average radius (the average radius R1) serving as the average curvature radius of the area from the first border position (P1) to the second border position (P2), and the second average radius (the average radius R2) serving as the average curvature radius of the area from the first border position (P1) to the third border position (P3). The first average radius (R1) is smaller than the second average radius (R2) by comparison. The addendum area (A3) includes the first curvature radius (the curvature radius R5) being provided at the first center position (P5) in a tooth thickness direction, the first curvature radius (the curvature radius R5) being set at a maximum.

According to the aforementioned construction, a second area of the tooth of the internal gear 1, the second area serving as the intermediate area A2 in the tooth depth direction, is formed in the trochoid curve. In a case where the internal gear 1 and the external gear 2 having a trochoid shape are meshed with each other, the distance of the respective axes of the internal gear 1 and the external gear 2 is desired to set precisely in order to enhance the transmission efficiency of the internal gear 1 and the external gear 2. However, in a case where the distance of the respective axes of the internal gear 1 and the external gear 2 is set appropriately, the engagement loss of the gears decreases. Accordingly, the contact ratio of the internal gear 1 and the external gear 2 is increased.

Here, the engagement loss serves as an energy loss generated by the sliding of the internal gear 1 and the external gear 2 when the internal gear 1 and the external gear 2 are meshed with each other to transmit the torque. The contact ratio of the internal gear 1 and the external gear 2 serves as a value that shows the respective numbers of teeth of the internal gear 1 and of the external gear 2 that are meshed with each other simultaneously in a case where the internal gear 1 and the external gear 2 are meshed with each other.

Because of the trochoid tooth profile, the specific sliding of the respective tooth surfaces is not greatly changed in accordance with the contact position of the teeth. The specific sliding between respective surfaces of the addendum area A3 and of the dedendum area A1 is constant. Accordingly, the smooth drive transmission is available. Unlike the involute gear in which the respective protruding surfaces are meshed with each other, the protruding surface and the recessed surface are mainly meshed with each other. Thus, the lubricant film is easily formed.

The trochoid shape being formed at the second area includes the protrusion 100 and the recessed portion 101 that are reversely and continuously provided at the addendum area A3 and at the dedendum area A1. Specifically, the average radius of the trochoid-shaped addendum area A3 increases to secure the contact area up to the distal end of the tooth. Thus, the internal gear 1 is unlikely to cause the tooth jump when the internal gear and the external gear are meshed with each other.

Because the curvature radius R5 that is positioned at the first center position P5 of the addendum area A3 in the tooth thickness direction is set at a maximum, the great volume of the addendum portion can be secured. Accordingly, the stress being applied to the addendum area A3 when the gear is meshed with the mating gear can be decreased. Thus, the tooth is unlikely to be damaged. Accordingly, the durability of the internal gear 1 can be enhanced.

According to the aforementioned embodiment, the first border position (P1) has the pressure angle that is set to be zero.

According to the first embodiment, when seen along the extending direction of the rotational axis, the pressure angle serves as an angle that is formed between the tangential line of the tooth surface and the straight line in a case where the straight line is drawn from the rotational center of the internal gear 1 to each position of the tooth surface. The pressure angle comes to be zero when the straight line and the tangential line at the tooth surface are overlapped with each other. That is, the extending direction of the tooth surface being positioned at the first border position P1 serves as the direction along the diameter direction of the internal gear 1. In this case, the tooth surface is positioned in the longitudinal direction. That is, when the respective teeth of the internal gear 1 and of the external gear 2 come in contact with each other, an angle that is formed between the first direction and the second direction is close to the right angle. The first direction serves as the direction applying a force to the internal gear 1 and the external gear 2 at the contact position, that is, the normal direction of the tooth surface. The second direction serves as the direction connecting the respective axes of the internal gear 1 and of the external gear 2. As a result, in a case where the great force is applied to the respective tooth surfaces, a component force that separates the internal gear 1 from the external gear 2 is unlikely to occur. Accordingly, the internal gear 1 unlikely causes the tooth jump.

According to the aforementioned embodiment, the dedendum area (A1) includes the first dimension (H1) along the tooth depth direction. The intermediate area (A2) includes the second dimension (H2) along the tooth depth direction. The addendum area (A3) includes the third dimension (H3) along the tooth depth direction. Each of the first dimension (H1) and the third dimension (H3) is set to be 5 to 10 percent of the second dimension (H2).

According to the first embodiment, the dimension H2 of the intermediate area A2 having the trochoid tooth profile is 80 to 90 percent of the whole dimension of the tooth in the tooth depth direction. Thus, an area that is effective for the gear contact, or the gear engagement can be widely maintained. Because the ratio of the dimension of the intermediate area A2 is enhanced, the respective shapes of a top land of the addendum area A3 and of a bottom land of the dedendum area A1 are inevitably flat. Comparing to the tooth profile in which the addendum and the dedendum of the tooth are downsized, the internal gear 1 includes the tooth having the rectangular-, or the substantially rectangular-tooth profile. Thus, the hardness of the addendum is enhanced. Accordingly, the internal gear 1 has the high durability.

According to the aforementioned embodiment, the addendum area (A3) includes the second curvature radius (curvature radius R5') that is set smaller towards the first border position (P1) from the first center position (P5).

According to the aforementioned construction, the curvature radius R5' comes to be decreased towards the first center position P5 of the curvature radius R5 of addendum area A3. Accordingly, the addendum area A3 includes the tooth profile that is formed in the rectangular-, or the substantially rectangular-shape. Thus, the volume of the portion of the addendum area A3 that extends towards the intermediate area A2 is securely maintained. Accordingly, the hardness of the portion is enhanced. As a result, because the damage of the tooth hardly occurs and the rigidity of the tooth is enhanced in accordance with the hardness of the tooth, the internal gear 1 is unlikely to cause the tooth jump.

According to the aforementioned embodiment, the dedendum area (A1) includes the third curvature radius (the curvature radius R4) being provided at the second center position (P4) in the tooth thickness direction. The first curvature radius (R5) is set greater than the third curvature radius (R4).

According to the aforementioned construction, because the curvature radius R5 is set greater than the curvature radius R4 in the tooth thickness direction, the shape of the bottom surface of the dedendum area A1, the dedendum surface that is positioned from the second center position P4 to the intermediate area A4, can be close to a round shape unlike the substantially rectangular-shape of the addendum area A3. As a result, in a case where the bending force is applied to the tooth due to the force applied to the internal gear 1 when the internal gear 1 and the external gear 2 are meshed with each other, the concentration of the stress caused around a dedendum portion can be reduced. Accordingly, the internal gear 1 is unlikely to cause the damage of the tooth.

According to the aforementioned embodiment, the die (3, 103) for the form rolling process includes the plural teeth, the plural teeth configuring the die (3, 103), the plural teeth each including the addendum area (a3) when seen from an extending direction of the rotary axis of the die (3, 103), the dedendum area (a1) when seen from the extending direction of the rotary axis of the die (3, 103), the intermediate area (a2) when seen from the extending direction of the rotary axis of the die (3, 103), the intermediate area (a2) including the protrusion (200) and the recessed portion (201), the intermediate area (a2) being continuously formed between the addendum area (a3) and the dedendum area (a1), the protrusion (200) protruding toward each of the teeth surfaces of the teeth, the teeth surfaces being positioned next to one another, the recessed portion (201) being recessed so as to be away from each of the teeth surfaces, the teeth surfaces being positioned next to one another, the intermediate area (a2) being continuously formed with the protrusion (200) and the recessed portion (201) to be formed in the trochoid curve. The intermediate area (a2) includes the first border position (p1) being provided at a position between the protrusion (200) and the recessed portion (201) and the second border position (p2) being provided at the position between the intermediate area (a2) and the dedendum area (a1), the third border position (P3) being provided at the position between the intermediate area (a2) and the addendum area (a3), the first average radius (r1) serving as the average curvature radius of an area from the first border position (p1) to the second border position (p2), and the second average radius (r2) serving as the average curvature radius of an area from the first border position (p1) to the third border position (p3). The first average radius (r1) is greater than the second average radius (r2) by comparison. The dedendum area (a1) includes the first curvature radius (the curvature radius r5) being provided at a first center position (p5) in the tooth thickness direction. The addendum area (a3) includes the second curvature radius (the curvature radius r4) being provided at a second center position (p4) in the tooth thickness direction. The first curvature radius (the curvature radius r5) is set smaller than the second curvature radius (the curvature radius r4).

According to the aforementioned construction, the die 3 serves as a tool for the roll forming process of the internal gear 1. In a case where the internal gear 1 is manufactured by the roll forming process, the die 3 serving as the tool includes the protrusion 200 and the recessed portion 201 that are reversely provided, or that are inside out comparing to the protrusion 100 and the recessed portion 101 of the internal gear 1 that is a product. Thus, the die has an effect that is similar to an effect that the internal gear 1 has.

According to the aforementioned construction, the second area of the tooth of the die 3, the second area that serves as the intermediate area a2 in the tooth depth direction, is formed in the trochoid shape. Accordingly, the internal gear 1 can be formed in the trochoid tooth profile. In a case where the work 1a is formed by the form rolling process, comparing to a case where the involute tooth profile is formed, the die 3 and a material are easily prevented from interfering with each other. As a result, the number of the tooth of the die 3 having the predetermined diameter can be increased. Thus, because the burden applied to the tooth is decreased, the life duration of the die 3 can be extended. Because the life duration of the die 3 is extended, the internal gear 1 that has high accuracy of processing can be provided.

The trochoid shape being formed at the second area includes the protrusion 200 and the recessed portion 201 that are reversely and continuously provided at the addendum area a3 and at the dedendum area a1. Specifically, the first average radius r1 of the recessed portion 201 being provided at the dedendum area a1 is greater than the second average radius r2 of the protrusion 200 being provided at the addendum area a3. Thus, because the tooth surface of the internal gear 1 being meshed with the mating gear can be provided up to the addendum area a3, the gear contact ratio increases. Accordingly, the internal gear 1 is unlikely to cause the tooth jump.

The curvature radius r4 is positioned at the second center position p4 of the addendum area a3 of the die 3 in the tooth thickness direction. The curvature r5 is positioned at the first center position p5 of the dedendum area a1 in the tooth thickness direction. The curvature radius r4 is set smaller than the curvature radius r5 in the tooth thickness direction. Thus, in a case where the tooth of the die 3 presses against the work 1a, the addendum of the die 3 favorably presses against the work 1a and the stress applied to the addendum is prevented from increasing. As a result, because the addendum is unlikely to cause the damage, the life duration of the die 3 is extended.

According to the aforementioned embodiment, the dedendum area (a1) includes the first dimension (h1) along a tooth depth direction. The intermediate area (a2) includes a second dimension (h2) along the tooth depth direction. The addendum area (a3) includes a third dimension (h3) along the tooth depth direction. Each of the first dimension (h1) and the third dimension (h3) is set to be 5 to 10 percent of the second dimension (h2).

According to the aforementioned construction, because the respective dimensions of the dedendum area a1 and of the addendum area a3 are set (limited), the internal gear 1 can be provided with the gear contact area that is 80 to 90 percent of the dimension of the tooth depth of the internal gear 1. Accordingly, the internal gear 1 has the high gear contact ratio.

According to the aforementioned construction, the addendum area (a3) includes the highest position (p41) that is dislocated to one of the first side and the second side relative to the second center position (p4) of the addendum area (a3).

The manufacturing method of an internal gear (1), the manufacturing method having the form rolling process being performed with the die (3, 103) for the form rolling process; the die (3, 103) includes the plural teeth, the plural teeth configuring the die (3, 103), the plural teeth each including the addendum area (a3) when seen from an extending direction of a rotary axis of the die (3, 103), the dedendum area (a1) when seen from the extending direction of the rotary axis of the die (3, 103), the intermediate area (a2) when seen from the extending direction of the rotary axis of the die (3, 103), the intermediate area (a2) including the protrusion (200) and the recessed portion (201), the intermediate area (a2) being continuously formed between the addendum area (a3) and the dedendum area (a1), the protrusion (200) protruding toward each of the teeth surfaces of the teeth, the teeth surfaces being positioned next to one another, the recessed portion (201) being recessed so as to be away from each of the teeth surfaces, the teeth surfaces being positioned next to one another; the intermediate area (a2) being continuously formed with the protrusion (200) and the recessed portion (201) to be formed in a trochoid curve. The intermediate area (a2) includes the first border position (p1) being provided at a position between the protrusion (200) and the recessed portion (201), the second border position (p2) being provided at the position between the intermediate area (a2) and the dedendum area (a1), the third border position (P3) being provided at the position between the intermediate area (a2) and the addendum area (a3), the first average radius (r1) serving as an average curvature radius of the area from the first border position (p1) to the second border position (p2), and the second average radius (r2) serving as an average curvature radius of an area from the first border position (p1) to the third border position (p3). The first average radius (r1) is greater than the second average radius (r2) by comparison. The dedendum area (a1)) includes the first curvature radius (the curvature radius r5) being provided at a first center position (p5) in a tooth thickness direction. The addendum area (a3) includes the second curvature radius (the curvature radius r4) being provided at a second center position (p4) in the tooth thickness direction. The first curvature radius (the curvature radius r5) is set smaller than the second curvature radius (r4).

According to the aforementioned embodiment, the dedendum area (a1)) includes the first dimension (h1) along the tooth depth direction. The intermediate area (a2) includes the second dimension (h2) along the tooth depth direction. The addendum area (a3) includes the third dimension (h3) along the tooth depth direction. Each of the first dimension (h1) and the third dimension (h3) is set to be 5 to 10 percent of the second dimension (h2).

According to the aforementioned embodiment, the addendum area (a3) includes the highest position (p41) that is dislocated to one of the first side and the second side relative to the second center position (p4) of the addendum area (a3).

When the die 3 presses against the work 1a, the base material of the work 1 that is pressed aside by the addendum of the die 3 is protruded along opposing ends (in the front-rear directions) of the tooth of the die 3. At this time, the stress applied to the tooth of the die 3 is increased at the front side of the die 3 in the rotational direction. That is, the external force that presses against the work 1a is increased at the front side of the die 3 in the rotational direction. Because the base material is pressed forward of the tooth of the die 3, the projecting portion 5 is generated at the position of the work 1a, the position that corresponds to the front side of the die 3 in the rotational direction. Because the stress applied to the addendum of the die 3 from the work 1a is applied from the frontward to the rearward of the tooth along the rotational direction, the bending force is applied to the rearward of the tooth in the rotational direction. The bending force causes the deformation and the damage of the tooth of the die 3.

Because the die 103 rotates so that the highest position p41 of the addendum area a3 of each tooth precedes or follows the second center position p4, or touches the work 1a earlier or later than the second center position p4, the stress applied to the frontward or the rearward of the tooth can be prevented from increasing. As a result, the base material of the work 1a does not include the excessive protrusion. Accordingly, the work 1a can be formed with the appropriate tooth profile. Because the tooth is prevented from being damaged, the life duration of the dice is extended.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A manufacturing method of an internal gear, the manufacturing method comprising:
   performing a form rolling process with a die for the form rolling process, the die including:
      a plurality of teeth, the plurality of teeth configuring the die, and the plurality of teeth each including:
         an addendum area when seen from an extending direction of a rotary axis of the die,
         a dedendum area when seen from the extending direction of the rotary axis of the die,
         an intermediate area when seen from the extending direction of the rotary axis of the die, the intermediate area including a protrusion and a recessed portion, the intermediate area being continuously formed between the addendum area and the dedendum area, the protrusion protruding toward a surface of an adjacent tooth, the recessed portion being recessed away from the surface of the adjacent tooth, the intermediate area being continuously formed with the protrusion and the recessed portion to be formed in a trochoid curve, wherein each intermediate area includes:
            a first border position positioned between the protrusion and the recessed portion,
            a second border position positioned between the intermediate area and the dedendum area,
            a third border position positioned between the intermediate area and the addendum area,
            a first average radius serving as a first average curvature radius of an area from the first border position to the second border position,
            a second average radius serving as a second average curvature radius of an area from the first border position to the third border position, and
            the first average radius being greater than the second average radius by comparison,
         the dedendum area includes a first curvature radius being provided at a first center position in a tooth thickness direction,
         the addendum area includes a second curvature radius being provided at a second center position in the tooth thickness direction, and
         the first curvature radius is set smaller than the second curvature radius; and
      the form rolling process includes the die to manufacture the internal gear, the internal gear including:
         a plurality of teeth configuring the internal gear, the plurality of teeth of the internal gear each including:
            an addendum area of the internal gear when seen from an extending direction of a rotary axis of the internal gear,
            a dedendum area of the internal gear when seen from the extending direction of the rotary axis of the internal gear, and
            an intermediate area of the internal gear when seen from the extending direction of the rotary axis of the internal gear, the intermediate area of the internal gear being continuously formed between the addendum area of the internal gear and the dedendum area of the internal gear, the intermediate area of the internal gear including a protrusion of the internal gear and a recessed portion of the internal gear, the protrusion of the internal gear protruding toward a surface of an adjacent tooth of the internal gear, the recessed portion of the internal gear being recessed away from the surface of the adjacent tooth of the internal gear, the intermediate area of the internal gear being continuously formed with the protrusion of the internal gear and the recessed portion of the internal gear to be formed in a trochoid curve, wherein each intermediate area of the internal gear includes:

a first border position of the intermediate area of the internal gear positioned between the protrusion of the internal gear and the recessed portion of the internal gear, a second border position of the intermediate area of the internal gear positioned between the intermediate area of the internal gear and the dedendum area of the internal gear, a third border position of the intermediate area of the internal gear positioned between the intermediate area of the internal gear and the addendum area of the internal gear, a first average radius of the intermediate area of the internal gear serving as a first average curvature radius of an area from the first border position of the intermediate area of the internal gear to the second border position of the intermediate area of the internal gear, a second average radius of the intermediate area of the internal gear serving as a second average curvature radius of an area from the first border position of the intermediate area of the internal gear to the third border position of the intermediate area of the internal gear, and the first average radius of the intermediate area of the internal gear is smaller than the second average radius of the intermediate area of the internal gear by comparison, and the addendum area of the internal gear includes a first curvature radius being provided at a first center position in an internal gear tooth thickness direction, the first curvature radius of the addendum area of the internal gear being set at a maximum.

2. The manufacturing method of the internal gear according to claim 1, wherein the dedendum area of the die includes a first dimension along a die tooth depth direction;

the intermediate area of the die includes a second dimension along the die tooth depth direction;

the addendum area of the die includes a third dimension along the die tooth depth direction; and each of the first dimension and the third dimension is set to be 5 to 10 percent of the second dimension.

3. The manufacturing method of the internal gear according to claim 1, wherein the addendum area of the die includes a highest position that is dislocated to one of a first side and a second side relative to the second center position of the addendum area of the die.

4. The manufacturing method of the internal gear according to claim 1, wherein using the die includes pressing the die against a work structure, and rotating the die so that a highest position of the addendum area or the die touches the work piece earlier or later than the second center position of the addendum area of the die.

* * * * *